US008749949B2

(12) United States Patent
Caporaso et al.

(10) Patent No.: US 8,749,949 B2
(45) Date of Patent: Jun. 10, 2014

(54) RESISTIVE FOIL EDGE GRADING FOR ACCELERATOR AND OTHER HIGH VOLTAGE STRUCTURES

(75) Inventors: George J. Caporaso, Livermore, CA (US); Stephen E. Sampayan, Manteca, CA (US); David M. Sanders, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 289 days.

(21) Appl. No.: 13/285,996

(22) Filed: Oct. 31, 2011

(65) Prior Publication Data

US 2013/0106316 A1 May 2, 2013

(51) Int. Cl.
*H01G 4/20* (2006.01)

(52) U.S. Cl.
USPC ........... 361/312; 361/303; 361/305; 361/311; 361/313; 361/306.2

(58) Field of Classification Search
USPC .............. 361/312, 303–305, 311, 313, 321.2, 361/306.2, 502–504, 509–512
See application file for complete search history.

(56) References Cited

U.S. PATENT DOCUMENTS

| | | | | | |
|---|---|---|---|---|---|
| 5,312,442 | A * | 5/1994 | O'Phelan | .......................... | 607/5 |
| 7,489,017 | B2 * | 2/2009 | Patel et al. | .................... | 257/532 |
| 7,710,051 | B2 * | 5/2010 | Caporaso et al. | ............ | 315/505 |
| 7,838,965 | B2 * | 11/2010 | Klee et al. | ..................... | 257/532 |
| 8,004,819 | B2 * | 8/2011 | Nagamiya et al. | ............ | 361/303 |
| 8,107,214 | B2 * | 1/2012 | Aoki | ............................ | 361/303 |

* cited by examiner

*Primary Examiner* — Nguyen T Ha
(74) *Attorney, Agent, or Firm* — John P. Wooldridge

(57) ABSTRACT

In a structure or device having a pair of electrical conductors separated by an insulator across which a voltage is placed, resistive layers are formed around the conductors to force the electric potential within the insulator to distribute more uniformly so as to decrease or eliminate electric field enhancement at the conductor edges. This is done by utilizing the properties of resistive layers to allow the voltage on the electrode to diffuse outwards, reducing the field stress at the conductor edge. Preferably, the resistive layer has a tapered resistivity, with a lower resistivity adjacent to the conductor and a higher resistivity away from the conductor. Generally, a resistive path across the insulator is provided, preferably by providing a resistive region in the bulk of the insulator, with the resistive layer extending over the resistive region.

19 Claims, 6 Drawing Sheets

RESISTIVE FOIL EDGE GRADING FOR ACCELERATOR AND OTHER HIGH VOLTAGE STRUCTURES

GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

This invention pertains generally to high voltage structures or devices including structures or devices for storing or transmitting electrical energy, and more particularly to reducing electric fields at the edges of conductors on insulators in these high voltage structures or devices.

2. Description of Related Art

When an insulator is placed between two conductors, typically metal, and the conductors are energized with high voltage, the electric field in the insulator reaches a maximum at the edges of the conductors. This enhanced field causes the insulator to fail at significantly lower electric potentials than it would without such field enhancement. The problem becomes more serious as the thickness of the conductors decreases, setting a limit on the electric field gradients that can be achieved, with a resulting limit on the ability to build compact high voltage systems.

The field enhancement is internal to the insulator material itself. A failure of the material would result in an internal bulk breakdown of the material. The cause of the field enhancement is the sharp edge of the conductor. The potential around this sharp edge discontinuity changes very rapidly by comparison to other regions away from the edge so the net result is an increased electric field. Breakdowns of this type occur very rapidly.

Various structures or devices for storing or transmitting electrical energy, e.g. capacitors, transmission lines, and accelerator components (e.g. Blumlein pulse generators), are constructed with pairs of conductors separated by insulators. These conductors generally form electrodes or transmission lines. For high voltages to be placed on these electrodes or transmission lines, the underlying insulator must not break down. The higher fields produced at the edges of the conductors decrease the voltage that can be placed across the conductors before breakdown occurs.

To make the structures or devices compact, the components, both conductors and insulators, must generally be made as thin as possible, requiring high gradients across the insulators. This magnifies the problem created by the field enhancement at the conductor edges.

Prior approaches to deal with the problem have generally focused on geometrical solutions. These have included rounding the edges of the conductors and using multiple dielectrics. However, these techniques have not been totally effective in combating the enhanced edge fields.

BRIEF SUMMARY OF THE INVENTION

An aspect of the invention is an apparatus for storing or transmitting electrical energy having a dielectric layer; a pair of conductors on opposed sides of the dielectric layer; a resistive layer formed on the dielectric layer abutting and surrounding at least one of the conductors; and a resistive or capacitive path between the opposed sides of the dielectric layer, the path electrically communicating with the resistive layer; wherein the resistive layer reduces electric field stress at the edge of the conductor when a high voltage is applied across the pair of conductors by allowing voltage to diffuse outwards from the conductor.

Typically, both conductors are surrounded by resistive layers, but if one conductor is much larger than the other, a resistive layer may surround only the smaller conductor. Preferably, the resistive layer has a tapered resistivity, with a lower resistivity adjacent to the conductor and a higher resistivity away from the conductor. Generally, a resistive path is provided, preferably by providing a resistive region in the bulk of the dielectric layer, with the resistive layer extending over the resistive region.

Another aspect of the invention is a method for reducing electric field stress at the edge of a conductor in an apparatus comprising a dielectric layer and a pair of conductors on opposed sides of the dielectric layer when a high voltage is applied across the pair of conductors, by providing a resistive layer on the dielectric layer abutting and surrounding at least one of the conductors; and providing a resistive or capacitive path between the opposed sides of the dielectric layer, the path electrically communicating with the resistive layer; thereby allowing voltage to diffuse outwards from the conductor when the voltage is applied.

Also an aspect of the invention is a dielectric wall accelerator (DWA) having a dielectric beam tube; a stack of Blumleins positioned along the beam tube to provide a sequence of voltage pulses to the beam tube; each Blumlein having first, second and third conductors; a first dielectric layer between the first and second conductors; a second dielectric layer between the second and third conductors; an electric field stress reducing resistive layer abutting and surrounding each conductor; and a switch connecting the second conductor to one of the first and third conductors; and a high voltage source connected to the second conductor of each Blumlein.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIGS. 4A, B show the calculated voltage and electric field, respectively, for a taper factor $\alpha$ of 25/m. FIGS. 4C, D show the calculated voltage and electric field, respectively, for a taper factor $\alpha$ of 100/m.

DETAILED DESCRIPTION OF THE INVENTION

Figure 2A:
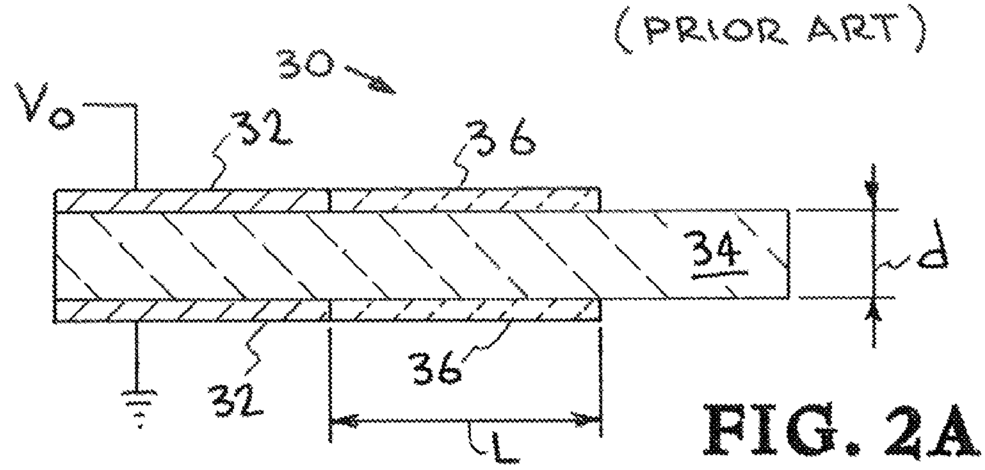
FIG. 2A is a cross-sectional view of a simple resistive model of the invention for reducing or eliminating the electric field enhancement at the edge of two conductors separated by an insulator.
Figure 9A:
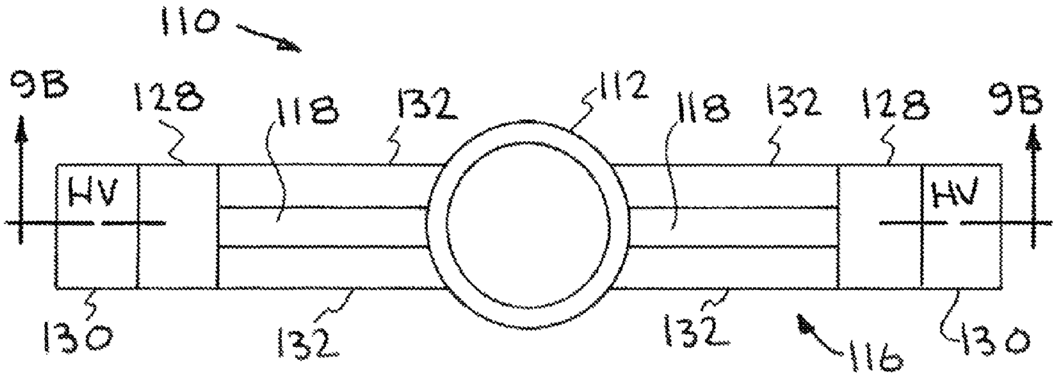
FIGS. 9A, B are top and side cross-sectional views of a dielectric wall accelerator having a stack of Blumlein pulse generators with conductors surrounded by the resistive layers of the invention.
Figure 9B:
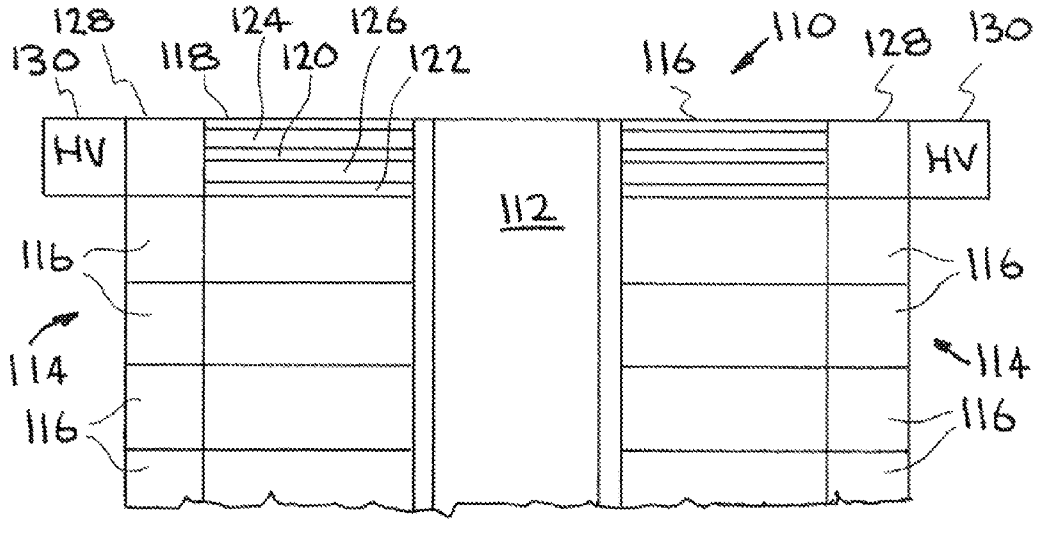

Referring more specifically to the drawings, for illustrative purposes the present invention is embodied in the apparatus and method generally shown in FIGS. 2A, B through FIG. 9A, B. It will be appreciated that the apparatus may vary as to configuration and as to details of the parts, and the method may vary as to its particular implementation, without departing from the basic concepts as disclosed herein.

The invention applies to basic energy storage and transmission structures or devices, particularly compact structures or devices designed to receive high energy. The essential elements of these structures or devices are a pair of electrical conductors, separated by an insulator, across which a voltage is placed.

Figure 1:
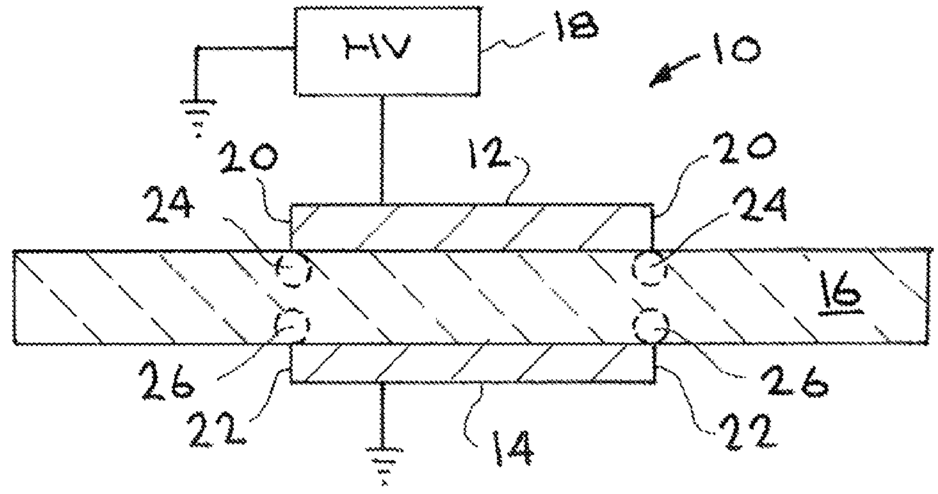
FIG. 1 (PRIOR ART)
FIG. 1 is a cross-sectional view of a prior art structure illustrating the electric field enhancement at the edge of two conductors separated by an insulator.

FIG. 1 shows a basic structure or device 10 formed of conductors 12, 14 on opposite sides of an insulator 16. A high voltage (HV) source 18 is connected across the two conductors 12, 14. Conductors 12, 14 are typically made of metal. Insulator 16 may be a flat substrate or other substrate made of an insulator or dielectric material.

The problem with the structure or device 10 is that the electric field in the insulator 16 is greatly increased near the edges 20, 22 of conductors 12, 14. When a high voltage is applied across electrodes 12, 14 a sharp discontinuity in electrical potential occurs in the regions 24, 26 of insulator 16 at the conductor edges 20, 22, and this produces the high electric field that may cause premature bulk breakdown of insulator 16.

The invention is method and apparatus to force the electric potential within the insulator to distribute more uniformly so as to decrease or eliminate the field enhancement. This is done by utilizing the properties of resistive layers to allow the voltage on the electrode to diffuse outwards, reducing the field stress at the electrode edge.

FIG. 2A shows a simple resistive model 30 of the invention, which has a pair of thin conductor electrodes 32 on opposed sides of a dielectric layer 34 of thickness "d". Thin resistive layers 36 lie on opposed sides of dielectric layer 34 adjacent to electrodes 32 and extend in the "z" direction a distance "L" from electrodes 32. The resistive layers 36 have a resistance "R" per unit length and the dielectric layer 34 has a capacitance "C" per unit length. A voltage source $V_0$ is connected to the electrodes 32 as in FIG. 1.

Figure 2B:
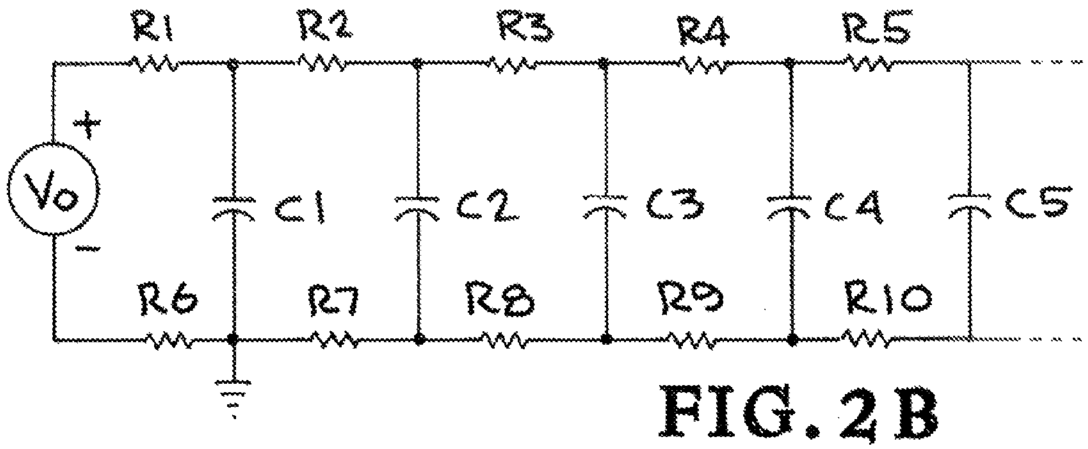
FIG. 2B is a circuit representation of the resistive model of the invention shown in FIG. 2A.

FIG. 2B is a circuit representation of resistive model 30 of the invention shown in FIG. 2A. The circuit is basically a RC transmission line, with series resistance and shunt capacitance per unit length, driven by a voltage source $V_0$. The resistive and capacitive elements in the circuit diagram are actually differential elements in that they represent resistance and capacitance per unit length. As such there are an infinite number of elements in the circuit diagram, only a few of which are shown. The diffusion of voltage from the electrodes through the RC circuit is given by:

$$\partial^2 V/\partial z^2 - RC\partial V/\partial t = 0.$$

The voltage V at the edge of the electrode (z=0) as a function of time is given by $V(0,t)=V_0(1-e^{-t/tr})$, where $t_r$ is the pulse risetime. The diffusion length D is approximately equal to $\sqrt{(\tau_p/(RC))}$ where $\tau_p$ is the pulse width. The z-component of the electric field $E_z$ is essentially the spatial derivative of the voltage $-\partial V/\partial z$, and the characteristic line impedance $Z=\sqrt{(R/(Cs))}$, where "s" is the Laplace transform variable. From this, the maximum electric field (z-component) $E_{zmax}$ can be calculated to be approximately $0.6V_0\sqrt{(RC/t_r)}$. Thus given the voltage applied to the electrodes ($V_0$), the risetime of the voltage pulse applied to the electrodes ($t_r$), and the properties of the dielectric layer (C), the resistance per unit length R of the resistive layer can be determined to provide an acceptable maximum electric field $E_{zmax}$ at the edge of the electrode.

It has also been determined that the resistance R per unit length meets the following conditions: $\tau_p/L^2 < RC < t_r/0.36d^2$. Again, from the known parameters of the voltage pulse ($\tau_p$, $t_r$), the dielectric layer properties (C, d), and various lengths L of the resistive layer, a range of suitable resistance values can be determined.

Figure 3:
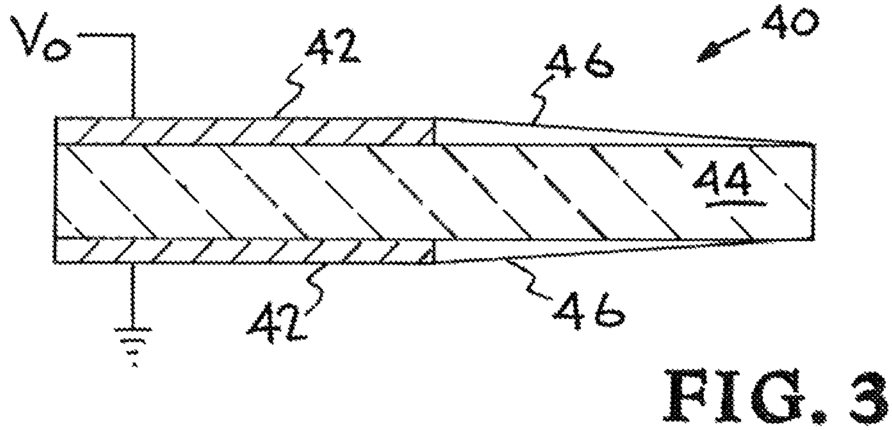
FIG. 3 is a cross-sectional view of a tapered resistive model of the invention.

FIG. 3 shows a tapered resistive model 40 of the invention, which has a pair of thin conductor electrodes 42 on opposed sides of a dielectric layer 44 of thickness "d". Thin tapered resistive layers 46 lie on opposed sides of dielectric layer 44 adjacent to electrodes 42 and extend in the "z" direction a distance "L" from electrodes 42. In an illustrative embodiment, the resistive layers 46 have a resistance "R(z)" with an exponential taper, i.e. $R(z)=R_0e^{\alpha z}$, where $R_0$ is the resistance at the edge of the electrode (z=0) and $\alpha$ is the taper factor, and the dielectric layer 44 has a capacitance "C" per unit length. Other tapers may also be used. A voltage source $V_0$ is connected to the electrodes 42 as in FIG. 1. As shown in FIG. 3 resistive layers 46 have a geometrical taper as well as a tapered resistance while resistive layers 36 in FIG. 2A have a constant thickness and constant resistivity per unit length.

The difference between models 30 and 40 is that in model 30 the resistance R was constant per unit length while in model 40 R grows exponentially with distance from the electrode. A circuit representation similar to FIG. 2B applies to model 40, with the tapered resistance. A voltage diffusion equation $\partial^2V/\partial z^2+\alpha\ \partial V/\partial z-R_0Ce^{\alpha z}\ \partial V/\partial t=0$ may be used (for an exponentially tapered resistance) to determine voltage diffusion and electric field as a function of system parameters and to find a suitable range of resistance values for the tapered resistive layer.

FIGS. 4A-D show the calculated results for two illustrative examples of the tapered RC line of FIG. 3. The electrode was a conductor with a radius of 2 cm. The resistive layers had a $\eta$ of 0.1 Ω-m; the initial thickness (at the edge of the electrode) was 40 μm, and $R_0$ was 20 kΩ/m. The dielectric layer had a dielectric constant $\epsilon_r$ of 10, a thickness of 6 mm, and a capacitance C of 1.85 nF/m. The voltage pulse had a 10 ns exponential risetime.

Figure 4A:
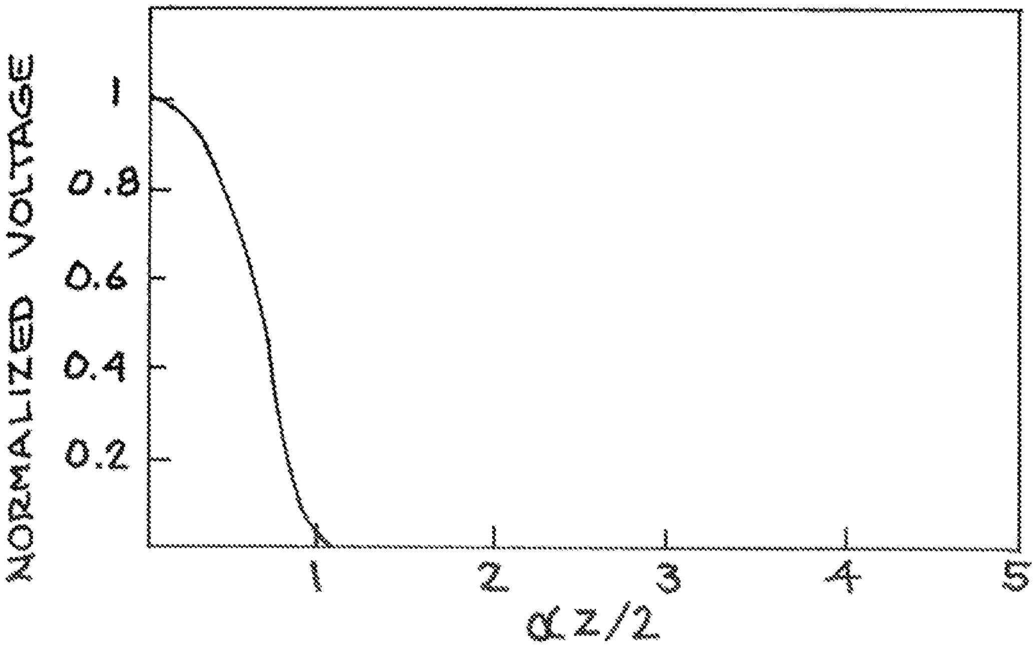
FIGS. 4A-D show the calculated results for two illustrative examples of the tapered RC line of FIG. 3.
Figure 4B:
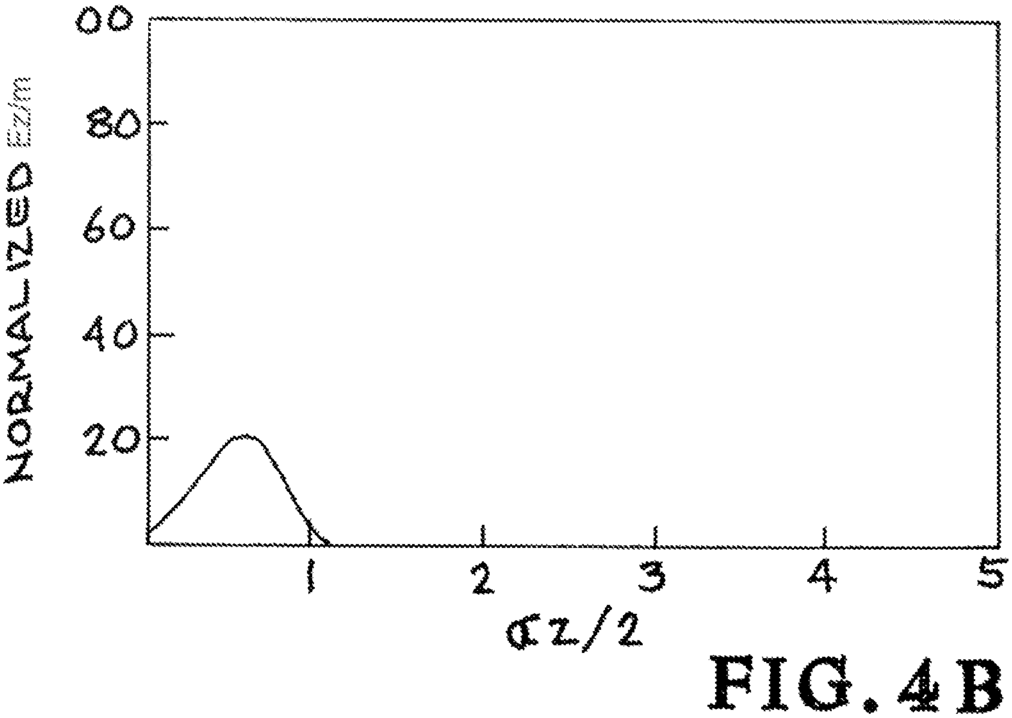
Figure 4C:
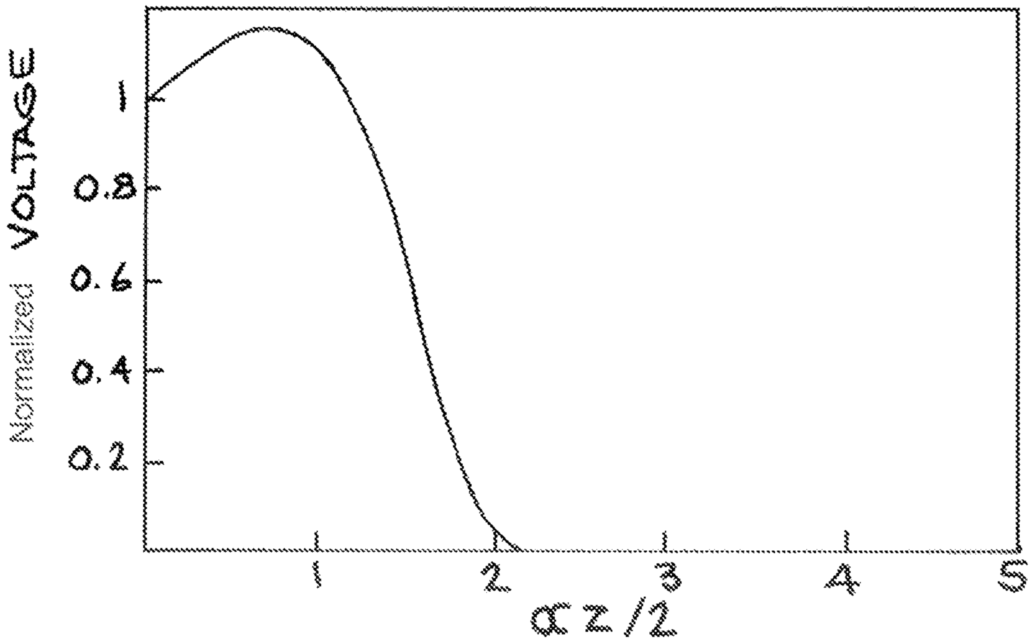
Figure 4D:
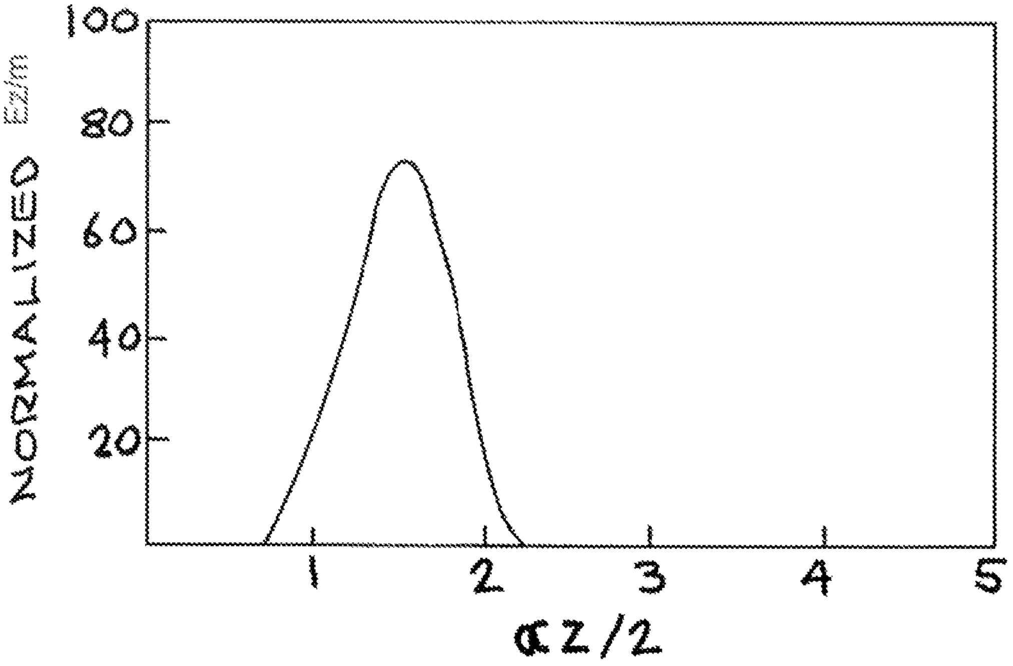

FIGS. 4A, B show the calculated voltage and electric field, respectively, for a taper factor $\alpha$ of 25/m. FIGS. 4C, D show the calculated voltage and electric field, respectively, for a taper factor $\alpha$ of 100/m. As is apparent by comparing the figures, an aggressive taper is worse than a more gradual one.

Figure 5A:
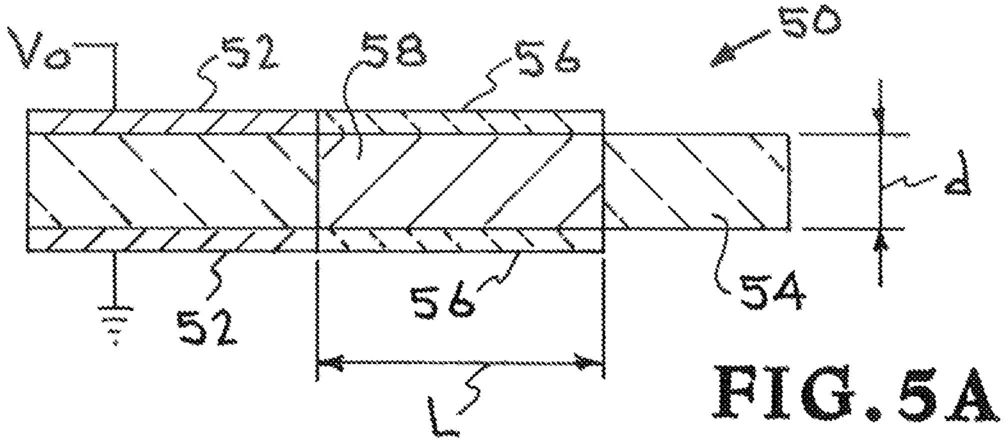
FIG. 5A is a cross-sectional view of an internal conductivity resistive model of the invention.

FIG. 5A shows an internal conductivity resistive model 50 of the invention, which has a pair of thin conductor electrodes 52 on opposed sides of a dielectric layer 54 of thickness "d".

Thin resistive layers 56 lie on opposed sides of dielectric layer 54 adjacent to electrodes 52 and extend in the "z" direction a distance "L" from electrodes 52. A region 58 of conductivity "G" is formed in dielectric layer 54 below the resistive layers 56. The resistive layers 56 have a resistance "R" per unit length and the dielectric layer 54 has a capacitance "C" per unit length. A voltage source $V_0$ is connected to the electrodes 52 as in FIG. 1.

Figure 5B:
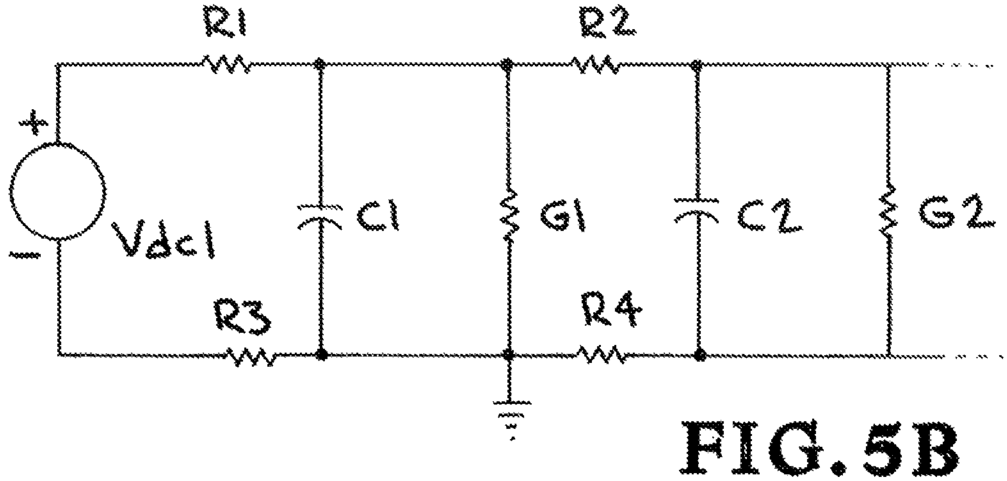
FIG. 5B is a circuit representation of the internal conductivity resistive model of the invention shown in FIG. 5A.

FIG. 5B is a circuit representation of internal conductivity resistive model 50 of the invention shown in FIG. 5A. The circuit is basically a resistive divider or RCG network, with series resistance and shunt capacitance and shunt conductance per unit length, driven by a voltage source $V_0$. The diffusion of voltage from the electrodes through the circuit is given by:

$$\partial^2 V/\partial z^2 - RC\partial V/\partial t - RGV = 0.$$

Again, the thin highly resistive layer allows voltage to diffuse outwards from the electrode, reducing field stress at the electrode edge. The internal conductivity in the dielectric layer produces a resistive divider network for later times. The diffusion length D is approximately equal to $\sqrt{(\tau_p/(RC))}$ where $\tau_p$ is the pulse width. The maximum electric field (z-component) $E_{zmax}$ can be calculated to be approximately $0.6V_0\sqrt{(RC/t_r)}$ where $t_r$ is the voltage pulse risetime. The conductivity G also leads to calculated values of $E_{zmax}(\infty) = V_0(\sqrt{(RG)})\,\mathrm{Tan\,h}((\sqrt{(RG)})\,L)$ and $E_{zedge}(\infty) = V_0(\sqrt{(RG)})/\mathrm{Cos\,h}((\sqrt{(RG)})\,L)$. FIG. 5C is a calculated graph of normalized voltage vs. $\sqrt{(RG)}$ times distance.

From the mathematical models, the following relationships have been determined: $RG<1/d^2$, $RC<t_r/0.36d^2$, and $(\sqrt{(RG)})L\geq 2$. From these relationships a range of suitable resistivity values for the resistive layers can be determined for various values of conductance G.

Figure 6:
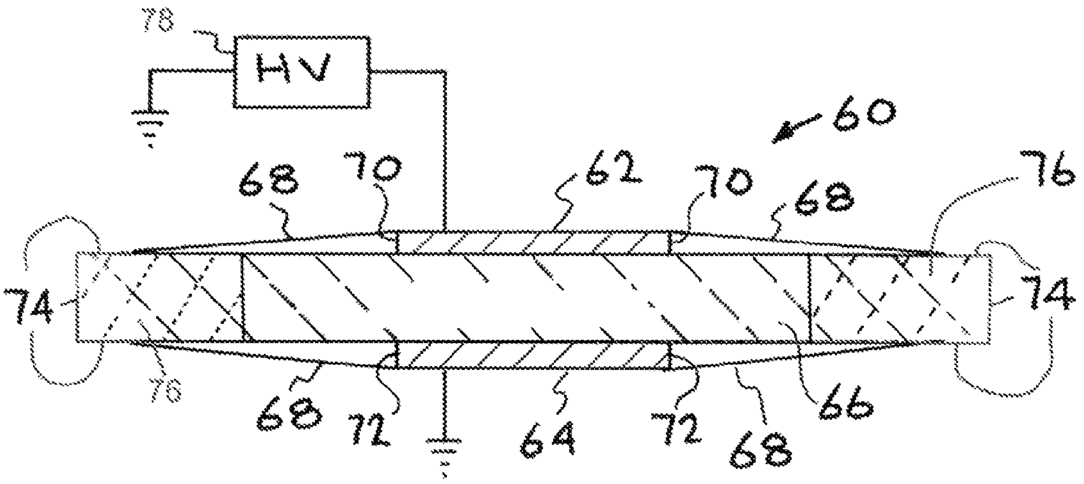
FIG. 6 is a cross-sectional view of a basic structure or device of the invention to implement the internal conductivity resistive model of the invention shown in FIG. 5A.

FIG. 6 shows a basic structure or device 60 of the invention to implement model 50, formed of conductors 62, 64 on opposite sides of an insulator 66. A high voltage (HV) source 78 is connected across the two conductors 62, 64. Insulator 66 may be a flat substrate or other substrate. In accordance with the invention, tapered resistive (or semiconductive) layers 68 are formed on insulator 66 adjacent to the conductor edges 70, 72.

Resistive layers 68 abut conductors 62, 64 and have a higher conductivity (lower resistivity) close to conductors 62, 64 and a lower conductivity (higher resistivity) away from the conductors 62, 64. Thus the layers 68 have a tapered or gradient conductivity (resistivity) extending from the edges of the conductors. The resistance taper may be exponential, as described above for model 40, or may be a general or other taper.

The invention is implemented by depositing layers 68 that have the appropriate electrical resistance at the conductor edges. With the appropriate resistive characteristics, these coatings divide the voltage that appears on the edges of the conductors in a manner that removes the electric field enhancement as described above.

Such division of voltage can only occur if there is a flow of current in the resistive layer 68. Without such a current flow, the voltage would reach a uniform level throughout the resistive coating, leading to a field enhancement at the edge of the resistive coating. If the value of resistance is chosen correctly and there is the necessary current flow leading to a division of the voltage along the resistive coating, the electric field concentration at the conductor edge is minimized, and the system can operate at higher overall field gradients independent of conductor thickness.

A simple method of providing a resistive current path is to coat the outside edge surfaces 74 of the insulator 66 with a resistive coating. The disadvantage of this approach is the requirement for the edge of the insulator to be carefully surfaced and coated to assure a uniform current path.

A preferred method of achieving the current flow is to fabricate the insulator 66 so that it has a resistive region 76 within the bulk of the insulator and outside the edges 70, 72 of the conductors 62, 64. The resistive layers 68 deposited on the insulator 66 adjacent to the conductor edges 70, 72 extend over these resistive regions 76. The resistive regions in the insulator provide a resistive current path without the requirement for specific surface preparation of the insulator edge. These resistive regions 76 correspond to conductive regions 58 of model 50 described above.

The resistive volume can be incorporated into the insulator during its fabrication. Alternately, this resistive volume can be generated later by diffusing dopants into the insulator that impart the desired resistive characteristics to that portion of the insulator.

Thus, by depositing a gradient conductor (i.e. resistive or semiconductive layer) at the edges of the conductors, and providing a resistive path connecting the gradient conductors on opposed sides of the insulator, the voltage is more uniformly distributed. The resistive connecting path is provided by surface resistive coatings on the insulator or more preferably by bulk resistive regions in the insulator.

The preferred way of allowing the potentials to distribute themselves is by establishing a current flow through a resistive material as described above with respect to FIG. 6 and as illustrated by RCG model 50. However, the capacitive division effect of model 30 may also be used.

Figure 7A:
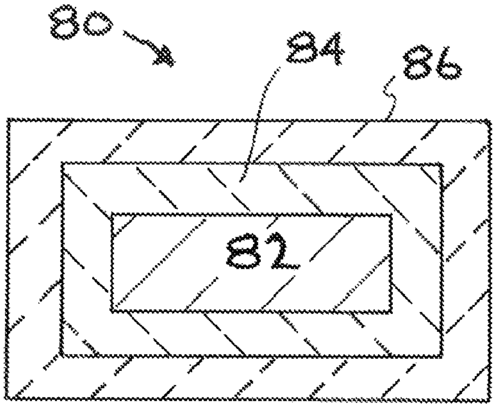
FIGS. 7A, B are top plan views of rectangular and circular shaped conductors, respectively, surrounded by resistive layers of the invention.
Figure 7B:
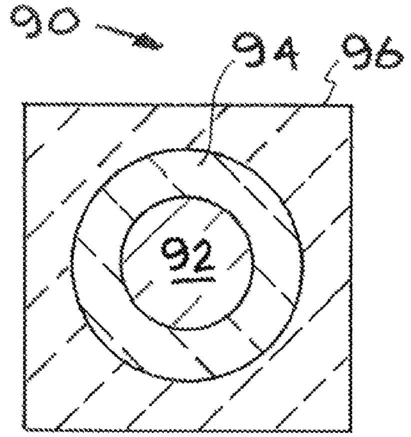

FIGS. 7A, B show two different electrode (conductor) geometries and the full configuration of the resistive layers of the invention. In FIG. 7A, a device 80 has a rectangular shaped electrode 82 surrounded by a resistive layer 84 of the invention on a dielectric substrate 86. Resistive layer 84 extends around all sides of electrode 82. In FIG. 7B, a device 90 has a circular shaped electrode 92 surrounded by a resistive layer 94 of the invention on a dielectric substrate 96. Resistive layer 94 extends around the circumference of electrode 92.

The invention applies to any structure for storing or transmitting electrical energy that has a minimum of two conductors separated by a dielectric. According to the invention, at least one of the conductors is surrounded by a semiconductive region that has higher conductivity close to the conductor and tapers off to a lower conductivity at a specified distance from the conductor. Preferably, a resistive path is also provided through the dielectric. At least one of the conductors is typically a flat or semi-flat plate. The semiconductive layer around the conductor is in a region of maximum field gradient.

Figure 8:
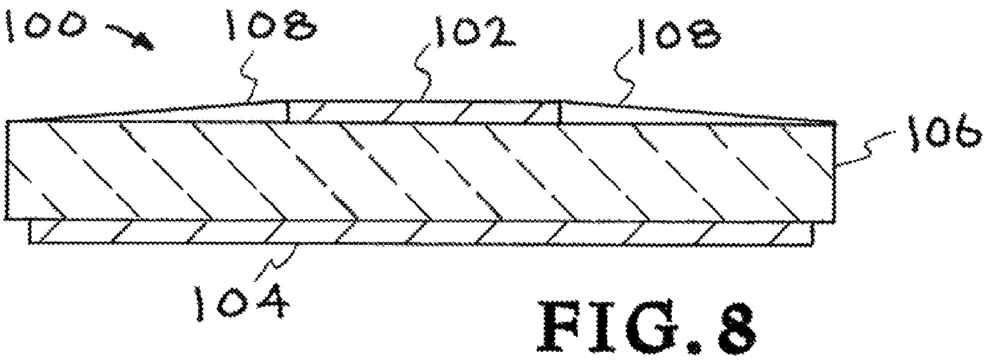
FIG. 8 is a cross-sectional view of a structure or device of the invention having a pair of electrodes of different size, where only the smaller electrode is surrounded by a resistive layer.

FIG. 8 shows a device 100 with a pair of electrodes 102, 104 on opposed sides of dielectric layer 106. Electrode 102 is much smaller than electrode 104. Tapered resistive (semiconductive) layer 108 is formed around electrode 102 but a similar layer is not provided around electrode 104. In this case it is necessary to reduce the electric field at the edge of electrode 102 since this field could cause breakdown across dielectric layer 106 to electrode 104 when a high voltage is placed across the electrodes. But any field at the edge of electrode 104 will not similarly cause breakdown. Since the edge of electrode 104 is far outside electrode 102 there will not be a high voltage gradient across dielectric 106 at the edge of the larger electrode 104 when the high voltage is applied. Therefore it is only necessary to provide the resistive layer around the smaller electrode when the other electrode is much larger. In general, the resistive layer will be placed along any edge where reduction of field stress is desired.

The dielectric wall accelerator (DWA) is a particular apparatus to which the invention can be applied. In a DWA high voltage pulses are applied along a dielectric beam tube through which particles are accelerated. These high voltage pulses are typically produced by stacks of Blumlein pulse generators (Blumleins). A Blumlein pulse generator is formed of three conductor strips (electrodes) separated by two dielectric layers. This structure is essentially two parallel plate transmission lines with a common center electrode and a closing switch in one of the transmission lines. Initially the center conductor is charged to a high voltage. When the switch is closed, a net voltage ultimately appears across the output end of the pulse generator. During pulse formation, the Blumleins develop high electric fields at the electrode edges, which causes breakdown and limits the high voltage pulses that can be achieved in the structure. If the pulse formation is disrupted, the operation of the DWA is impaired. It is necessary to produce the highest voltage pulses to drive the DWA since the higher the electric field gradient along the beam tube, the greater the acceleration, resulting in a more compact DWA. The basic principles of Blumleins and DWAs are described in U.S. Pat. Nos. 2,465,840 and 5,757,146 respectively. Current embodiments of Blumleins and DWAs are shown in U.S. Pat. Nos. 7,710,051; 7,756,499; and 7,173,385. All of these patents are herein incorporated by reference.

The utilization of the invention in a DWA is illustrated in FIGS. 9A, B. Dielectric wall accelerator (DWA) 110 is formed of a dielectric beam tube 112 surrounded by opposed stacks 114 of Blumleins (Blumlein pulse generators) 116. Each Blumlein 116 is formed of three electrodes or conductor lines 118, 120, 122 separated by two dielectric layers 124, 126, and includes a switch 128 for connecting center electrode 120 to one of the outside electrodes 118, 122. Blumlein 116 is connected to a high voltage source (HV) 130. Initially the center electrode 120 is charged to the high voltage by HV source 130. The switch 128 is then closed to connect the (charged) center electrode 120 to one of the outside electrodes 118 or 122. A voltage pulse is produced at the end of Blumlein 116 adjacent to beam tube 112. The HV source 130 is electrically connected to all the Blumleins 116 in stack 114. The switches 128 are closed in sequence along the length of beam tube 112 so that a sequence of voltage pulses propagates along the length of beam tube 112. In accordance with the invention, each electrode 118, 120, 122 in a Blumlein 116 is surrounded by a resistive layer 132, as shown in FIG. 9A around electrode 118. These resistive layers 132 reduce electric field stress at the edges of electrodes 118, 120, 122 and allow the Blumleins 116 to deliver the full high voltage pulses to beam tube 112.

The invention also includes a method for reducing or eliminating electric field enhancement at the edges of conductors (electrodes) in a structure having a pair of conductors separated by an insulator (dielectric). The method includes forming conductive (resistive) layers, preferably layers of gradient conductivity, adjacent to the conductors, and providing a resistive path, or alternately a capacitive path, connecting the gradient conductivity layers. The gradient conductivity layers have higher conductivity (lower resistivity) adjacent to the conductor edges and lower conductivity (higher resistivity) away from the conductor edges.

The invention thus provides a method and apparatus for reducing or eliminating electric field enhancement at conductive electrodes on dielectric (insulator) layers in a variety of high voltage electrical energy storage and transmission structures and devices. These include capacitors, transmission lines, and Blumlein pulse generators in dielectric wall accelerators (DWAs).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. Apparatus for storing or transmitting electrical energy, comprising:
- a dielectric layer;
- a pair of conductors on opposed sides of the dielectric layer;
- a resistive layer formed on the dielectric layer abutting and surrounding at least one of the conductors; and
- a resistive or capacitive path between the opposed sides of the dielectric layer, the path electrically communicating with the resistive layer;
- wherein the resistive layer reduces electric field stress at the edge of the conductor when a high voltage is applied across the pair of conductors by allowing voltage to diffuse outwards from the conductor.

2. The apparatus of claim 1, wherein both conductors are surrounded by resistive layers.

3. The apparatus of claim 1, wherein the resistive layer has a tapered resistivity.

4. The apparatus of claim 3, wherein the resistive layer has a lower resistivity adjacent to the conductor and a higher resistivity away from the conductor.

5. The apparatus of claim 3, wherein the resistive layer has an exponentially tapered resistivity.

6. The apparatus of claim 1, wherein one conductor is much larger than the other, and a resistive layer surrounds only the smaller conductor.

7. The apparatus of claim 1, wherein the path comprises a resistive path.

8. The apparatus of claim 7, wherein the resistive path comprises a resistive region in the bulk of the dielectric layer, and the resistive layer extends over the resistive region.

9. The apparatus of claim 1, wherein the resistive layer extends a distance L from the conductor and has a resistance R per unit length, the dielectric layer has a thickness d and a capacitance C per unit length and a region of conductivity G per unit length, and R meets the following conditions: $RG<1/d^2$, $RC<t_r/0.36d^2$, and $(\sqrt{(RG)})\,L\geq 2$, wherein $t_r$ is the pulse risetime of a voltage pulse applied to the conductor.

10. The apparatus of claim 1, wherein the resistive layer extends a distance L from the conductor and has a resistance R per unit length, the dielectric layer has a thickness d and a capacitance C per unit length, and R meets the following conditions: $\tau_p/L^2<RC<t_r/0.36d^2$, wherein $\tau_p$ and $t_r$ are the pulse width and pulse risetime of a voltage pulse applied to the conductor.

11. The apparatus of claim 1, comprising a capacitor, a transmission line, or a Blumlein pulse generator for a dielectric wall accelerator.

12. A method, comprising:

providing an apparatus for storing or transmitting electrical energy, said apparatus comprising:

a dielectric layer;

a pair of conductors on opposed sides of the dielectric layer;

a resistive layer formed on the dielectric layer abutting and surrounding at least one of the conductors; and a resistive or capacitive path between the opposed sides of the dielectric layer, the path electrically communicating with the resistive layer;

wherein the resistive layer reduces electric field stress at the edge of the conductor when a high voltage is applied across the pair of conductors by allowing voltage to diffuse outwards from the conductor;

the method further comprising applying a high voltage across the pair of conductors, wherein the resistive or capacitive path allows voltage to diffuse outwards from the conductor when the voltage is applied.

13. The method of claim 12, wherein a resistive layer is provided around each conductor.

14. The method of claim 12, further comprising forming the resistive layer with a tapered resistivity.

15. The method of claim 14, further comprising forming the resistive layer with a lower resistivity adjacent to the conductor and a higher resistivity away from the conductor.

16. The method of claim 14, further comprising forming the resistive layer with an exponentially tapered resistivity.

17. The method of claim 12, wherein one conductor is much larger than the other, comprising forming a resistive layer around only the smaller conductor.

18. The method of claim 12, comprising providing a resistive path.

19. The method of claim 18, wherein providing a resistive path comprises forming a resistive region in the bulk of the dielectric layer, the resistive layer extending over the resistive region.

* * * * *